United States Patent Office 3,033,836
Patented May 8, 1962

3,033,836
PROCESS FOR THE PRODUCTION OF
OLEFINIC ELASTOMERS
Bruce R. Tegge, Madison, and John L. Bryan, Jr., Summit, N.J., assignors to Esso Research and Engineering Company, a corporation of Delaware
No Drawing. Filed Dec. 31, 1958, Ser. No. 784,041
4 Claims. (Cl. 260—85.3)

The present invention relates to an improved process for making olefinic elastomers. More particularly it relates to a continuous polymerization reaction in which an isoolefin hydrocarbon reactant is polymerized in the presence or absence of a minor amount of multiolefin at a low temperature.

Heretofore numerous difficulties have been encountered in polymerizing isobutylene, especially when conjugated diolefin comonomers are employed. Reactor fouling, which is a major problem in preparing polyisobutylene and butyl rubber, has been extensively studied over the years in an effort to prevent it and thereby increase reactor capacity and run lengths. The average butyl rubber reactor run time in commercial units is approximately 20 to 30 hours. Thus, most of these reactors are only on stream one day before they are shut down and cleaned out for the next run. Moreover, the fouling decreases the efficiency with which heat is transferred from the exothermic reaction in the reactor to the refrigerant in the cooling jacket. Thus, if the reactor becomes substantially fouled with polymer, there is a possibility that a run-away reaction will occur. In addition, the reactor production rate must either be decreased or the reactor temperature allowed to increase. Under the latter condition, the reactor fouls even faster and polymer product quality is adversely affected.

It has now been discovered that reactor fouling can be reduced and increased reactor capacity can be realized by employing certain critical conditions to be hereinafter described in detail.

A thorough investigation of reaction conditions showed that it is absolutely essential to maintain the monomer concentration in the reactor liquid below 10 wt. percent, e.g. in the range of 3–8 wt. percent. In fact to obtain the highest possible reactor capacity, the monomer concentration should not be less than 4 wt. percent nor more than 7 wt. percent of the liquid in the reactor (ca. 3 to 6 wt. percent of the total reactor contents). To achieve and maintain this low monomer concentration in the reactor liquid throughout the run, it is usually necessary to use somewhat more than the normal amount of catalyst. This may be accomplished by adjusting upwardly the catalyst feed rate until the desired low monomer concentration is obtained in the reactor liquid.

While maintaining the monomer concentration at the above-mentioned level, the concentration of polymer in the slurry leaving the reactor is kept at a minimum of 18 wt. percent, but may be allowed to rise as high as 25 or even 30 wt. percent provided the monomer concentration is maintained at the previously mentioned low levels. The specific polymer slurry concentration will depend upon the percent monomer conversion which should not be permitted to fall below about 75%.

In practicing the present invention, an isoolefin containing 4 to 7 carbon atoms and having a purity of 99.2 wt. percent or more, e.g. 99.3 to 99.8 wt. percent, is polymerized with or without a minor amount of relatively high purity, for example over 95 wt. percent, hydrocarbon multiolefin by means of a Friedel-Crafts catalyst in solution, the polymerization being carried out at a temperature between about −130° F. and −155° F. The monomer composition charged to the reactor may consist of 95 to 100 parts by weight of isobutylene and from 0 to 5 parts by weight of a conjugated diolefin hydrocarbon having 4 to 8 carbon atoms which is usually isoprene, but may be dimethylbutadiene, piperylene, cyclopentadiene, divinyl benzene, etc., or mixtures thereof. The invention has particular application to the butyl rubber reaction wherein the monomer composition is 95 to 99.5 parts by weight of isobutylene and 0.5 to 5 parts by weight of a diolefin, such as isoprene. The monomers are charged to the reactor, mixed and diluted with an alkyl halide diluent (ca. 27 to 40 wt. percent solution), such as ethyl or methyl chloride, which has been cooled so that diluent-monomer feed is at least −130° F. The total monomer concentration in the total diluent charged to the reactor, including catalyst diluent, is between 25 and 35 wt. percent. The higher concentrations, e.g. 30–35 wt. percent, are employed where very high capacity is desired, but at some sacrifice in polymer molecular weight occasioned by the required high monomer conversion level.

The catalyst solution is a Friedel-Crafts catalyst dissolved in a low freezing non-complex forming solvent, such as a $C_1$ to $C_3$ alkyl halide. Preferably it consists of about 0.05 to 0.5 wt. percent of aluminum trichloride dissolved in methyl chloride. However, other Friedel-Crafts catalysts such as those disclosed by N. O. Calloway in the article entitled "The Friedel-Crafts Synthesis," printed in Chemical Reviews, volume 17, No. 3, beginning on page 327.

If the monomer feed charged to the reactor contains 100 parts by weight monomer and about 155 to 270 parts by weight diluent, the amount of aluminum trichloride catalyst added as a 0.05 to 0.5 wt. percent solution will be about 0.015 to 0.15 part by weight and the total amount of diluent in the reactor will be about 185 to 300 parts by weight.

The reactor should be equipped with a refrigerating jacket containing boiling ethylene. Generally, liquid ethylene's temperature ranges from −145 to −170° F. The liquid ethylene is fed into the lower end of the jacket and is removed from the upper end of the jacket as a vapor. The reactor may be of the tubular type having an agitator located near the bottom of the reaction zone capable of imparting a linear velocity to the slurry of about 8–15 ft./sec. These relatively high velocities decrease the rate of reactor fouling and help maintain good heat transfer. The cylindrical vessel may have a large diameter centrally located up-draft tube surrounded by a plurality of small diameter down-draft tubes. The direction of flow is immaterial and may be reversed if desired. The up-draft tube and the down-draft tubes provide a plurality of circulating passages in which the reactor contents circulate. Each tube may be surrounded by the cooling ethylene refrigerant jacket.

In some instances it may be necessary to use a high catalyst rate, up to about 200% of normal, to initiate the reaction. Upon initiation of the reaction, the feed composition and catalyst rate may be adjusted to obtain the desired conversion. The amount of catalyst may vary from 0.015 to 0.15 wt. percent based on the monomer feed. The pressure in the reactor may vary from subatmospheric to superatmospheric, depending upon the other conditions employed and the type of reactor being used. Generally speaking, the pressure may be as low as 10 p.s.i.a. or as high as 250 p.s.i.a.

After completion of the reaction, a slurry containing 18–30 wt. percent, preferably 20–30 wt. percent, polymer and an alkyl halide diluent is discharged from the reactor via an overflow conduit to a flash drum which may be fitted with an agitator. The flash drum may contain a substantial quantity of hot liquid which is capable of flashing off the diluent and unreacted monomers. For instance, water maintained at a temperature of 130–200°

F. may be advantageously employed. In this case, a slurry of polymer in water is formed. The polymer may be recovered in a solid form by either filtering the polymer slurry and drying the polymer or driving the water off by means of heat or vacuum or both. The alkyl halide diluent and monomers recovered overhead from the flash tank are dried and the diluent is separated from the unreacted monomers ($C_4$ components) by fractionation. Some pure diluent containing only trace amounts of isobutylene is first fractionated from the bulk of recycle diluent, which may contain some isobutylene, e.g. about 5 wt. percent. The relatively pure diluent is used as a solvent for the Friedel-Crafts catalyst, e.g. aluminum trichloride. The recycle diluent plus pure monomers are recovered by fractionation and then cooled to between −130 and −155° F., with say liquid ethylene, before being recycled to the reactor. Butenes and isoprene impurities are purged as bottoms streams from the fractionation system.

The Mooney viscosity at 212° F. (large rotor, after 8 minutes) of the polymer recovered may vary from 40–90 or even higher. In order to make polymer having a Mooney viscosity of 70–80 and maintain a monomer conversion of 85% or more, e.g. 85 to 95% the isobutylene should have a purity of at least 99.2 wt. percent. If less pure isobutylene is employed, the percent conversion in the reactor must be decreased. This will increase the monomer concentration in the reactor and increase the rate of polymer fouling in the reactor.

In one embodiment of the invention, the polymerization reaction is conducted at the freezing point of the reactor liquid. The freezing point of pure methyl chloride is −144° F. By employing low polymerization temperatures, e.g. −148 to −153° F. for 97 to 93 wt. percent methyl chloride, respectively, it is possible to produce a thin layer of frozen methyl chloride on the inner surface of the reactor. This will substantially reduce reactor fouling and permit longer runs. The increase in run length is particularly noticeable if the layer of frozen methyl chloride is present on the inner walls of the reactor during at least a substantial part, e.g. one-half, of the total run length time. Alternatively, a frozen layer having a greater or lesser thickness may be maintained on the walls during the entire run length. In order to maintain a frozen layer of methyl chloride throughout the run, it is necessary to keep the temperature of the contents of the reactor below −144° F., preferably between about −148 and −153° F. as mentioned above.

However, while the above-mentioned low temperature polymerization reactions are conductive to longer run lengths and less fouling, it may be necessary to initiate the reaction by employing an excess of catalyst and a high temperature in the reactor, i.e. above −145° F. This may be conveniently accomplished by exerting a small amount of pressure, e.g. about 14 to 17 p.s.i.a., on the ethylene refrigerant in the cooling jacket surrounding the reaction zone. Once the reaction initiates, as indicated by a rise in the temperature differential between the refrigerant and the reactor contents, the pressure on the refrigerant may be lowered about 8 to 12 p.s.i. to adjust the system to the desired temperature.

The polymers prepared according to the process described herein may have a viscosity average molecular weight of from 100,000 up to 1,500,000 or higher. If the polymer is butyl rubber, it may have a Wijs iodine number of 1 to 50, and a mole percent unsaturation between 0.5 and 15.

In practicing a preferred embodiment of the present invention, 7500 lbs./hr. of a polymerizable feed comprising a mixture of 97.0 wt. percent isobutylene having a purity of 99.5%, and 3.0 wt. percent of isoprene having a purity of 96.5% was continuously charged to a tubular reactor of the type described above along with 15,600 lbs./hr. of methyl chloride. Simultaneously, 1900 lbs./hr. of a methyl chloride solution containing 0.15 wt. percent aluminum chloride was charged into the reactor. The concentration of the aluminum halide catalyst in the reaction zone was maintained at 0.03 wt. percent of the reactor contents until the polymerization reaction initiated. Thereafter it was reduced to about 50% to 0.013 wt. percent by adjusting the amount of recycle diluent introduced into the reaction zone. Concurrently with the introduction of the catalyst into the reactor, liquid ethylene at −149° F. was circulated through the cooling jacket under 17 p.s.i.a. pressure until the polymerization reaction commences. Upon initiation of the reaction, the pressure exerted on the ethylene was reduced to 11 p.s.i.a. thereby lowering the temperature of the ethylene refrigerant to −162° F. The reactor contents for the first 15 hours of the run were maintained at −150° F. As the polymerization proceeded, the catalyst rate was maintained at 2.85 lbs./hr. of aluminum trichloride and the polymer concentration in the slurry leaving the reactor was maintained at 25.5 wt. percent or a polymer production rate of 6375 lbs./hr. At the same time the monomer conversion amounted to 85% and the hydrocarbon or monomer concentration in the reactor was maintained at 4.5 wt. percent. The circulation rate of the reactor contents was maintained at about 10 ft./sec.

The polymer slurry was continuously discharged from the reactor at a rate of 25,000 lbs./hr. into a flash drum, fitted with an agitator, containing water at 160° F. and under 18 p.s.i.a. pressure. At these conditions all of the methyl chloride and the unreacted monomers were flashed off and a water slurry containing 2.8 wt. percent polymer was recovered. The flashed diluent and monomers and water vapor are cooled to condense most of the water. The vapors are then compressed under 60 p.s.i.a. pressure and dried by passing through a bed containing small particles (ca. 8 mesh) of alumina. The alumina treatment removes water and any oxygenated organic impurities that may be present, e.g. dimethyl ether. The diluent and monomers are then fractionated in a conventional fractionating tower. The tower, which is operated at about 120° F. and 175 p.s.i.a. pressure, is equipped with a reboiler (reflux ratio 11 to 1) and 50 plates for efficient fractionation. Pure methyl chloride for catalyst solvent is recovered from the upper portion of the fractionating tower at a temperature of 120° F. and a pressure of 150 p.s.i. After the addition of aluminum trichloride catalyst, it is cooled to −130° F. with liquid ethylene and recycled to the reaction zone via the catalyst line. The bottoms of the fractionating column were introduced into a diluent recycle column having 20 plates and operating at a reflux ratio of 1.5 to 1. The diluent taken overhead which was at 130° F. and under 170 p.s.i.a. pressure, was also cooled to −140° F. with ethylene. The recycled streams, which contained 97 wt. percent methyl chloride and 3 wt. percent isobutylene, were mixed with 30 parts by weight of the monomers in the same proportion mentioned above and reintroduced into the reactor. The bottoms of the second fractionating column, which were mostly unreacted monomers, were purged. The reactor was on stream 20 hrs.

The butyl rubber recovered by filtering from the water slurry in the flash drum had a viscosity average molecular weight of 640,000, a mole percent unsaturation of 1.7 and Mooney viscosity (8 minutes on large rotor) at 212° F. of 79. The rubber was used in the manufacture of automobile tires, curing bladders, wire insulation, etc.

The desired low monomer concentration in the reactor can be facilitated by (1) increasing the isobutylene feed purity, i.e. pretreating the isobutylene to remove most of the objectionable n-butylene impurities, (2) increasing the purge rate of $C_4$ impurities from the fractionation system, and (3) increasing the isoprene feed purity, particularly by removing the objectionable $C_5$ acetylenes.

While the run described above was halted at the end of 20 hours, much longer runs. e.g. 100 hours, may be achieved at lower throughputs, such as 18,000 to 20,000 lbs./hr. of monomer, diluent and catalyst. The specific example given demonstrates the very high capacity that may be obtained by the practice of the novel process described herein. Under the conditions presently used in butyl rubber reactors, the capacity of the same reactor is about 3300 to 3500 lbs./hr. or approximately one-half that of a reactor operated in accordance with the present invention. Even if the reactor is operated for 30 hours at this lower throughput (3300 to 3500 lbs./hr.), it would produce substantially less butyl rubber than the 127,500 lbs. of product obtained in the above-described run. Thus, by carrying out the polymerization in accordance with one embodiment of the present invention, the operator can increase his capacity almost 100%.

In summary, it has been shown that it is possible to increase the capacity of a given polymerization reactor system by maintaining the monomer concentration in the reactor at a low level, keeping the monomer conversion to polymer in the polymerization reactor at a level of at least 75%, preferably 80% or higher, and maintaining the temperature of the reactants in the reaction mixture below about $-144°$ F. In order to prepare polymer, under the aforementioned conditions, having a Mooney viscosity (212° F.—at 8 minutes, large rotor) of 70 or more it is necessary to use isobutylene which is 99.3 wt. percent or more pure.

Resort may be had to various modifications and variations of the present invention without departing from the spirit of the discovery or the scope of the appended claims.

What is claimed is:

1. Process for preparing homopolymers of isobutylene and copolymers of a major proportion of isobutylene with minor proportions of a multiolefin which comprises continuously introducing 100 parts by weight of monomers selected from the group consisting of isobutylene and mixtures of 95 to 99.5% isobutylene and 0.5 to 5 parts by weight of a multiolefin, about 185 to 300 parts by weight alkyl halide diluent and about 0.015 to 0.15 part by weight Friedel-Crafts catalyst into a reaction zone which is maintained at about $-130$ to $-155°$ F., continuously circulating the monomer, alkyl halide and catalyst in the reaction zone at about 8 to 15 ft./sec., continuously regulating the catalyst concentration in the reaction zone to keep the total monomer concentration in the liquid in said zone in the range of 3 to 8 wt. % based on reaction zone liquid, continuously maintaining conversion of monomer to polymer in the range of 85 to 95%, continuously withdrawing from the reaction zone a slurry containing 20 to 30 wt. percent isobutylene-containing polymer, continuously introducing the polymer slurry into a flash zone containing a hot liquid wherein the unreacted monomers and alkyl diluent are separated from the polymer, continuously separating the monomers from the alkyl halide diluent and recycling at least a part of said diluent to the reaction zone, and separating the polymer from the hot liquid in the flash zone.

2. Process according to claim 1 in which the isobutylene is at least 99.3 wt. percent pure isobutylene.

3. Process according to claim 1 in which the isobutylene-containing monomer introduced into the reaction zone comprises 95–99.5 wt. percent isobutylene and 0.5 to 5 wt. percent isoprene.

4. Process according to claim 1 in which the catalyst is aluminum chloride.

References Cited in the file of this patent

UNITED STATES PATENTS

| | | |
|---|---|---|
| 2,507,100 | Garber et al. | May 9, 1950 |
| 2,636,026 | Nelson | Apr. 21, 1953 |
| 2,834,762 | McKenzie et al. | May 13, 1958 |

FOREIGN PATENTS

| | | |
|---|---|---|
| 682,695 | Great Britain | Nov. 12, 1952 |